(12) United States Patent
Diacakis et al.

(10) Patent No.: US 7,246,371 B2
(45) Date of Patent: Jul. 17, 2007

(54) SYSTEM AND METHOD FOR FILTERING UNAVAILABLE DEVICES IN A PRESENCE AND AVAILABILITY MANAGEMENT SYSTEM

(75) Inventors: Athanassios Diacakis, Pittsburgh, PA (US); Daniel Cohen, Pittsburgh, PA (US)

(73) Assignee: Openwave Systems Inc., Redwood City, CA (US)

( * ) Notice: Subject to any disclaimer, the term of this patent is extended or adjusted under 35 U.S.C. 154(b) by 856 days.

(21) Appl. No.: 10/068,759

(22) Filed: Feb. 5, 2002

(65) Prior Publication Data

US 2002/0120687 A1    Aug. 29, 2002

Related U.S. Application Data

(60) Provisional application No. 60/266,559, filed on Feb. 5, 2001.

(51) Int. Cl.
*H04L 9/00* (2006.01)
(52) U.S. Cl. .......................................... 726/2; 709/204
(58) Field of Classification Search ................ 713/150; 709/204–207; 726/22, 2
See application file for complete search history.

(56) References Cited

U.S. PATENT DOCUMENTS

| | | | |
|---|---|---|---|
| 4,313,035 A | 1/1982 | Jordan et al. | |
| 4,740,788 A | 4/1988 | Konneker | |
| 5,208,756 A | 5/1993 | Song | |
| 5,218,367 A | 6/1993 | Sheffer et al. | |
| 5,239,577 A | 8/1993 | Bates et al. | |
| 5,243,645 A | 9/1993 | Bissell et al. | |
| 5,251,248 A | 10/1993 | Tokunaga et al. | |
| 5,255,306 A | 10/1993 | Melton et al. | |
| 5,315,636 A | 5/1994 | Patel | |
| 5,329,578 A | 7/1994 | Brennan et al. | |
| 5,428,678 A | 6/1995 | Fitzpatrick et al. | |
| 5,436,963 A | 7/1995 | Fitzpatrick et al. | |

(Continued)

FOREIGN PATENT DOCUMENTS

DE    19946960 A1    4/2001

(Continued)

OTHER PUBLICATIONS

"IRC FAQ: Introduction to IRC for people using Windows", May 7, 2000, pp. 1-18, mIRC.com archive.org snapshot.*

(Continued)

*Primary Examiner*—Jacques H. Louis-Jacques
*Assistant Examiner*—Thomas Ho
(74) *Attorney, Agent, or Firm*—Townsend and Townsend and Crew LLP

(57) ABSTRACT

A method for communicating communication network availability information regarding an individual to at least one subscriber of the individual's availability information. According to one embodiment, the method includes detecting whether the individual is present on at least one communication network and determining availability of the individual for each access level of a profile of the individual. The method further includes publishing via a network the availability of the individual to the subscriber based on an access level of the subscriber and the presence information. In addition, the method includes filtering the availability of the individual when it is detected that the individual is no longer present on the communication network.

3 Claims, 9 Drawing Sheets

U.S. PATENT DOCUMENTS

| | | |
|---|---|---|
| 5,436,965 A | 7/1995 | Grossman et al. |
| 5,440,541 A | 8/1995 | Lida et al. |
| 5,440,620 A | 8/1995 | Slusky |
| 5,475,819 A | 12/1995 | Miller et al. |
| 5,493,692 A | 2/1996 | Theimer et al. |
| 5,497,412 A | 3/1996 | Lannen et al. |
| 5,550,907 A | 8/1996 | Carlsen |
| 5,577,100 A | 11/1996 | McGregor et al. |
| 5,577,111 A | 11/1996 | Lida et al. |
| 5,592,533 A | 1/1997 | McHenry et al. |
| 5,721,678 A | 2/1998 | Widl |
| 5,742,905 A | 4/1998 | Pepe et al. |
| 5,761,277 A | 6/1998 | Foladare et al. |
| 5,767,788 A | 6/1998 | Ness |
| 5,774,802 A | 6/1998 | Tell et al. |
| 5,777,989 A | 7/1998 | McGarvey |
| 5,787,354 A | 7/1998 | Gray et al. |
| 5,802,161 A | 9/1998 | Svoronos et al. |
| 5,819,084 A | 10/1998 | Shapiro et al. |
| 5,826,039 A | 10/1998 | Jones |
| 5,862,331 A | 1/1999 | Herriot |
| 5,872,926 A | 2/1999 | Levac et al. |
| 5,884,221 A | 3/1999 | Wortham |
| 5,896,448 A | 4/1999 | Holt |
| 5,903,845 A | 5/1999 | Buhrmann et al. |
| 5,905,789 A | 5/1999 | Will |
| 5,928,325 A | 7/1999 | Shaughnessy et al. |
| 5,930,702 A | 7/1999 | Goldman et al. |
| 5,933,788 A | 8/1999 | Faerber et al. |
| 5,963,912 A | 10/1999 | Katz |
| 5,983,265 A | 11/1999 | Martino, II |
| 5,987,113 A | 11/1999 | James |
| 5,991,828 A | 11/1999 | Horie et al. |
| 6,016,512 A | 1/2000 | Huittema |
| 6,018,737 A | 1/2000 | Shah et al. |
| 6,023,762 A | 2/2000 | Dean et al. |
| 6,032,175 A | 2/2000 | Fletcher et al. |
| 6,047,054 A | 4/2000 | Bayless et al. |
| 6,058,179 A | 5/2000 | Shaffer et al. |
| 6,076,093 A | 6/2000 | Pickering |
| 6,081,705 A | 6/2000 | Houde et al. |
| 6,097,793 A | 8/2000 | Jandel |
| 6,104,799 A | 8/2000 | Jain et al. |
| 6,104,931 A | 8/2000 | Havinis et al. |
| 6,125,176 A | 9/2000 | Foladare et al. |
| 6,130,938 A | 10/2000 | Erb |
| 6,134,447 A | 10/2000 | Havinis et al. |
| 6,138,003 A | 10/2000 | Kingdon et al. |
| 6,154,776 A | 11/2000 | Martin |
| 6,157,953 A | 12/2000 | Chang et al. |
| 6,195,696 B1 | 2/2001 | Baber et al. |
| 6,212,392 B1 | 4/2001 | Fitch et al. |
| 6,243,451 B1 | 6/2001 | Shah et al. |
| 6,243,714 B1 | 6/2001 | Shapiro et al. |
| 6,256,504 B1 | 7/2001 | Tell et al. |
| 6,282,427 B1 | 8/2001 | Larsson et al. |
| 6,301,609 B1 * | 10/2001 | Aravamudan et al. ...... 709/207 |
| 6,332,158 B1 | 12/2001 | Risley et al. |
| 6,336,117 B1 | 1/2002 | Massarani |
| 6,360,102 B1 | 3/2002 | Havinis et al. |
| 6,389,457 B2 | 5/2002 | Lazaridis et al. |
| 6,446,112 B1 | 9/2002 | Bunney et al. |
| 6,449,344 B1 * | 9/2002 | Goldfinger et al. ...... 379/88.17 |
| 6,456,852 B2 | 9/2002 | Bar et al. |
| 6,463,288 B1 | 10/2002 | Havinis et al. |
| 6,484,130 B2 | 11/2002 | Dwyer et al. |
| 6,577,865 B2 | 6/2003 | Dikmen et al. |
| 6,640,241 B1 | 10/2003 | Ozzie et al. |
| 6,671,259 B1 | 12/2003 | He et al. |
| 6,700,967 B2 | 3/2004 | Kleinoder et al. |
| 6,871,224 B1 | 3/2005 | Chu et al. |
| 2001/0049745 A1 | 12/2001 | Schoeffler |
| 2001/0054037 A1 | 12/2001 | Shapiro et al. |
| 2002/0019816 A1 | 2/2002 | Shafrir et al. |
| 2002/0021307 A1 | 2/2002 | Glenn et al. |
| 2002/0023159 A1 | 2/2002 | Vange et al. |
| 2002/0065630 A1 | 5/2002 | Dwyer et al. |
| 2002/0065828 A1 | 5/2002 | Goodspeed |
| 2002/0073233 A1 | 6/2002 | Gross et al. |
| 2002/0076010 A1 | 6/2002 | Sahai |
| 2002/0078233 A1 | 6/2002 | Biliris et al. |
| 2002/0083127 A1 | 6/2002 | Agrawai |
| 2002/0085701 A1 | 7/2002 | Parsons et al. |
| 2002/0087704 A1 | 7/2002 | Chesnais et al. |
| 2002/0116336 A1 | 8/2002 | Diacakis et al. |
| 2002/0116461 A1 | 8/2002 | Diacakis et al. |
| 2002/0120687 A1 | 8/2002 | Diacakis et al. |
| 2002/0120774 A1 | 8/2002 | Diacakis |
| 2002/0126701 A1 | 9/2002 | Requena |
| 2002/0183077 A1 | 12/2002 | Fomukong |
| 2003/0023690 A1 | 1/2003 | Lohita |
| 2003/0048195 A1 | 3/2003 | Trossen |
| 2003/0135624 A1 | 7/2003 | McKinnon et al. |
| 2004/0117443 A1 | 6/2004 | Barsness |
| 2004/0203879 A1 | 10/2004 | Gardner et al. |

FOREIGN PATENT DOCUMENTS

| | | |
|---|---|---|
| EP | 0926871 A2 | 6/1999 |
| EP | 1087595 A2 | 3/2001 |
| EP | 1117263 A2 | 7/2001 |
| EP | 1347624 A3 | 3/2005 |
| WO | WO 00/04730 A1 | 1/2000 |
| WO | WO 00/27143 A1 | 5/2000 |
| WO | WO 00/69140 A1 | 10/2000 |
| WO | WO 01/26393 A1 | 4/2001 |
| WO | WO 01/33825 A1 | 5/2001 |
| WO | WO 01/35683 A1 | 5/2001 |
| WO | WO 01/52511 A1 | 7/2001 |

OTHER PUBLICATIONS

"mIRC FAQ", May 7, 2000, pp. 1-11, mIRC.com archive.org snapshot.*

"AOL Instant Messenger 4.0" May 10, 2000, www.AIM.com archive.org snapshot.*

Brian Underdahl, 1998, IDG Books Worldwide, "Windows 98: One Step at a Time", pp. 307-308.*

Rosenberg, et al., SIP for Presence. Internet Engineering Task Force (Internet Draft), Nov. 13, 1998, Bell Laboratories, Columbia University, 18 pgs.

Bhaskaran, Raman, et al. Universal Inbox: Providing Extensible Personal Mobility and Service Mobility in an Integrated Communication Network, CS Division, EECS Department, U.C. Berkeley, CA 94720, USA.

Windows 98 Unleased, Sams Publishing, Paul McFedries, May 12, 1998, Chapter 31.

HowStuffWorks How Domain Name Servers Work, Marshall Brain.

Day, M. et al.; "A Model for Presence and Instant Messaging"; 2000 *RFC* 2778, 18 pages.

Milewski, Allen E. et al.; "Providing Presence Cues to Telephone Users"; 2000, *AT&T Labs, Research*, pp. 89-96.

* cited by examiner

OFFICE PROFILE

| Communication Media | Address | Important | Normal | Restricted | Blocked |
|---|---|---|---|---|---|
| Home telephone | (412) 555-1234 | No | No | No | No |
| Office telephone | (412) 555-0101 | Yes (preferred) | Yes | No | No |
| Mobile telephone | (412) 555-4567 | Yes | No | No | No |
| Voicemail | (800) 555-mail | Yes | Yes (preferred) | Yes | No |
| Personal e-mail | user@domain.com | Yes | No | No | No |
| Work e-mail | user@company.com | Yes (preferred) | Yes (preferred) | No | No |
| Instant messaging | user@someplace.com | Yes | No | No | No |

Fig. 2

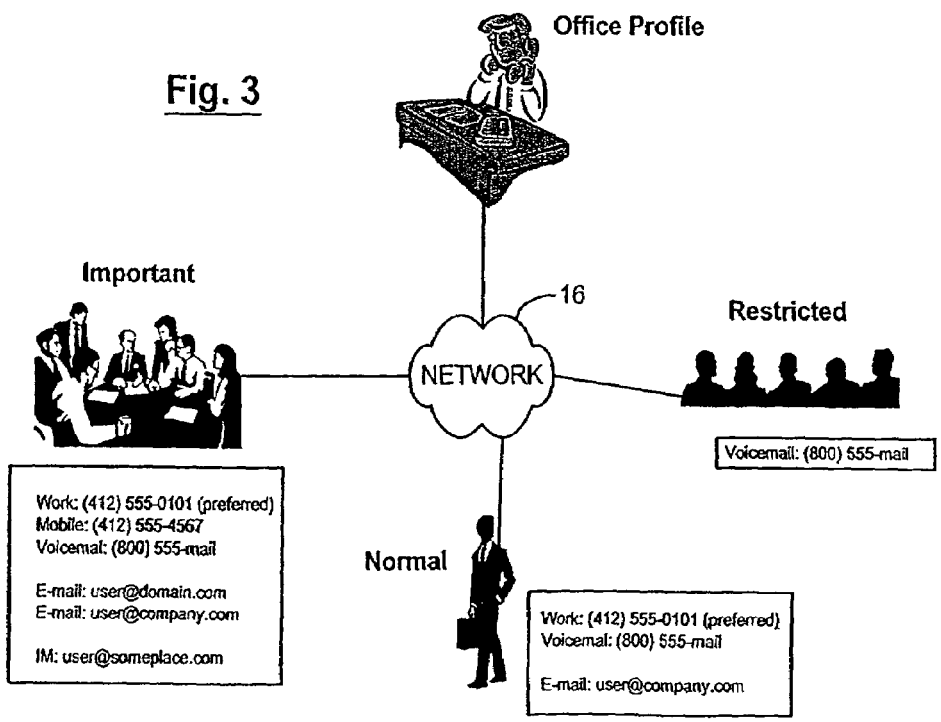

Fig. 3

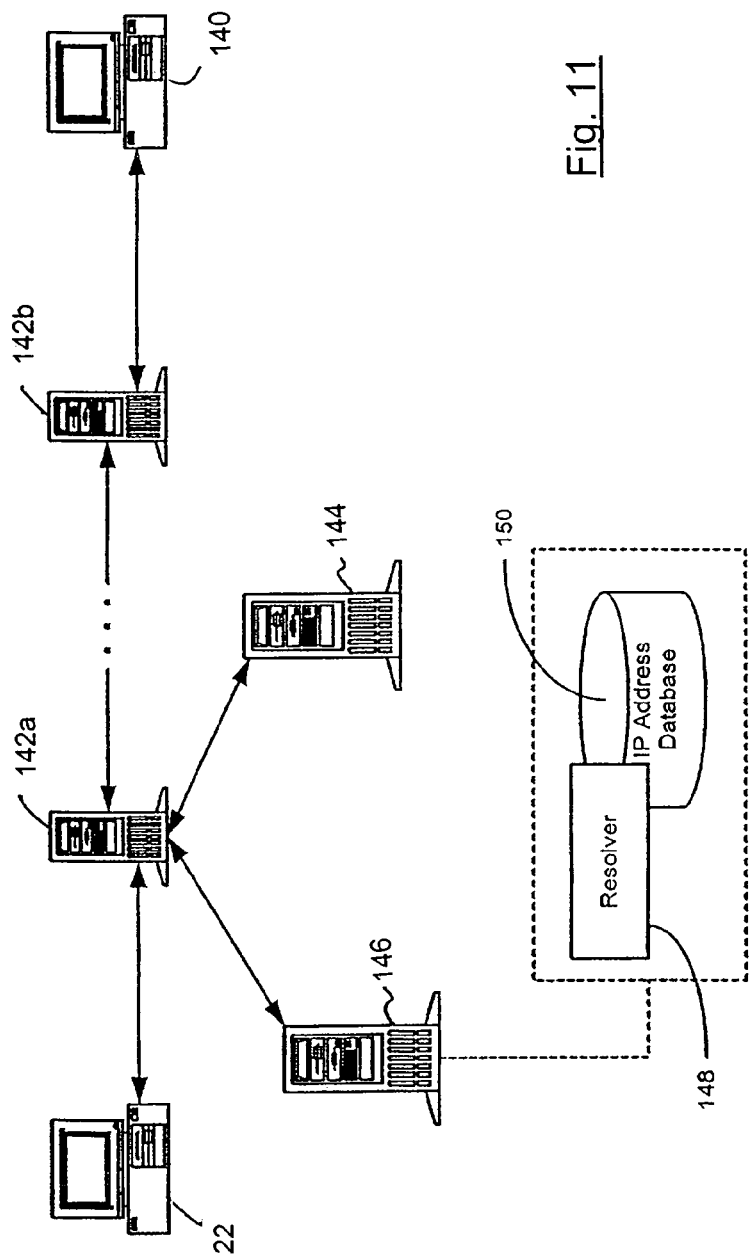

SYSTEM AND METHOD FOR FILTERING UNAVAILABLE DEVICES IN A PRESENCE AND AVAILABILITY MANAGEMENT SYSTEM

CROSS-REFERENCE TO RELATED APPLICATIONS

This application claims priority under 35 U.S.C. § 119 to U.S. provisional patent application Ser. No. 60/266,559, filed Feb. 5, 2001, which is incorporated herein by reference.

BACKGROUND OF INVENTION

1. Field of Invention

The present invention relates generally to communications and, more particularly, to presence and availability management systems.

2. Description of the Background

A presence and availability management system enables users to control their availability and how that is displayed to other users. Accordingly, users may select if they want to be available to any given person (or group of people) or not, as well as how that person (or group of people) may or may not contact them. In addition, a presence and availability management service enables users to view the availability of their contacts and use that information to determine whether or not and how to initiate communications.

Presence and availability management services have two primary functions. First, to collect information from multiple sources to determine the presence and, according to user-defined preferences, the availability of a given person. For example, a presence and availability management service needs information on what communications network a user is on, and whether or not the user is reachable for each of the networks. Second, a presence and availability management service must distribute the availability information of a given person to interested individuals on a selective basis, according to a variety of user-defined preferences and settings.

In addition to those functions, conventional presence and availability management services have two secondary functions. First, to configure access control settings. A presence and availability management service provides users with the ability to configure an observer's access settings, thereby giving users the ability to control what contact information observers are allowed to view. Thus, users have the choice of what information is published to each of their observers. Second, to store user information to enable the use of the presence and availability management service regardless of the user's network device. By storing user information on the back-end of the presence and availability management system, the presence and availability management service enables users to utilize its services regardless of the user's network device as long as they have a device that is within a communications network. Thus, users can access the presence and availability management service if they are on a cellular phone, a handheld device or a computer workstation.

In a conventional presence and availability management enabled communications system, individuals must request the appropriate presence and availability information from the presence and availability management sub-system when they want to communicate with other individuals on the communications network. However, this model poses two issues. First, such systems do not make the presence and availability information about an individual continuously available to others. Thus, the user's interface cannot display the individual's presence and availability information on a continuous basis. Accordingly, users cannot simply quickly glance at a contact list to see who is available. Second, having to retrieve presence and availability information only when it is needed creates a delay at a critical point in time where user tolerance for it is low.

BRIEF SUMMARY OF THE INVENTION

In one general respect, the present invention is directed to a method for communicating communication network availability information regarding an individual to at least one subscriber of the individual's availability information. According to one embodiment, the method includes detecting whether the individual is present on at least one communication network and determining availability of the individual for each access level of a profile of the individual. The method further includes publishing via a network the availability of the individual to the subscriber based on an access level of the subscriber and the presence information. In addition, the method includes filtering the availability of the individual when it is detected that the individual is no longer present on the communication network.

In another general respect, the present invention is directed to a presence and availability (P&A) management server for communicating communication network availability information regarding an individual to at least one subscriber of the individual's availability information. According to one embodiment, the server includes a presence detection engine for detecting whether the individual is present on at least one communication network and an availability management engine in communication with the presence detection engine for publishing to the subscriber, via a network, communication network availability of the individual. The server additionally includes an adaptive feedback module in communication with the presence detection engine and the availability management engine.

BRIEF DESCRIPTION OF THE FIGURES

Embodiments of the present invention are described in conjunction with the following figures, wherein:

FIG. 2 is an example of an availability profile according to one embodiment of the present invention;

FIG. 3 is a diagram depicting what information subscribers at various access levels receive for the profile of FIG. 2;

FIG. 11 is a diagram of a system with a secondary domain name server according to one embodiment of the present invention.

DETAILED DESCRIPTION OF THE INVENTION

It is to be understood that the figures and descriptions of the following embodiments have been simplified to illustrate elements that are relevant for a clear understanding of the present invention, while eliminating, for purposes of clarity, other elements. For example, certain operating system details and modules of computer processing devices are not described herein. Those of ordinary skill in the art will recognize, however, that these and other elements may be desirable in a typical communications network. However, because such elements are well known in the art, and because they do not facilitate a better understanding of the present invention, a discussion of such elements is not provided herein.

Figure 1:
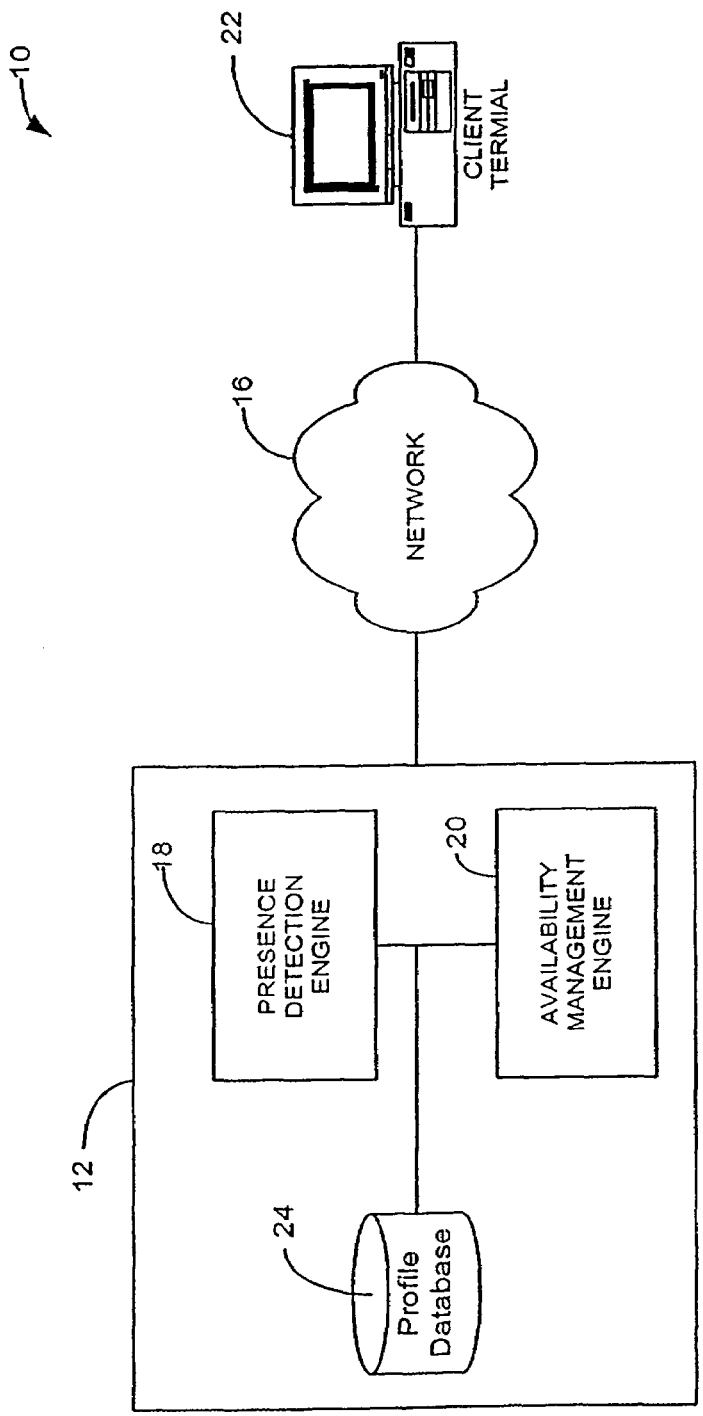
FIG. 1 is a block diagram of a presence and availability (P&A) management system according to one embodiment of the present invention.

FIG. 1 is a diagram of a presence and availability (P&A) management system 10 according to one embodiment of the present invention. The system includes a P&A management server 12 in communication with a client terminal 22 via a network 16. The client terminal 22 is sometimes referred to herein as "a client." The P&A management server 12 include a presence detection engine 18 and an availability management engine 20. Profile information, as described further herein, may be stored in a database 24 of the server 12. The P&A management server 12 is in communication with at least one client terminal 22. In FIG. 1, only one client terminal 22 is illustrated, although a number of other client terminals may also be in communication with the P&A management server 12 via the network 16. The client terminal 22 is illustrated as a personal computer in FIG. 1, although according to other embodiments the client terminal may be another type of communication device such as, for example, a wireless telephone (such as a WAP (Wireless Application Protocol)-enabled phone) or a wireless or connected personal digital assistant (PDA).

The network 16 may be any connected system of, for example, communication lines, channels, and radio interfaces, used to exchange information between the P&A management server 12 and the client 22. According to one embodiment, the network 16 may include, for example, the Internet, an intranet, the public switched telephone network (PSTN), or a wireless telephone or radio network. According to one embodiment, the P&A management server 12 and client 22 may communicate via the network 16 using an open draft TCP/IP based protocol.

As used herein, the term "presence" is defined as the ability of an individual to access a particular communications network. For example, if a person is near a landline telephone or wireless telephone that is switched on, that person is "present" on a telephone network, i.e., the person is able to use the telephone network to communicate with other people also on the network. Conversely, if a person is not near a landline telephone or wireless telephone, or the wireless telephone is switched off, then that person is not present on a telephone network, and thus unable to communicate with others on the telephone network. Similarly, if a person uses an instant messaging (IM) application at a given point in time, the person is present on that instant messaging network.

In addition, as used herein the term "availability" is defined as the willingness of an individual who is present on one or more communications networks to be reached by one or more persons. Following the telephone network example above, if a person is near a landline or wireless telephone and has the intention or willingness to answer the phone when a particular person calls, the person is not only present but available on the telephone network. However, if the person is unwilling or unable to answer either phone when it rings, although present, the person is not available.

It should be noted that a person needs to be present on a network in order to be available, yet the opposite is not necessarily true. In addition, presence is absolute. That is, a person is either present or not on a given network. However, availability depends on, e.g., other people, situations, circumstances, personal preferences, etc. For example, a person can be available to a first group of people, but unavailable to a separate group.

According to one embodiment, the system 10 employs a publisher-subscriber model. According to such an embodiment, an individual defines a P&A profile set, which is stored on the P&A management server 12. When the individual transmits a change in profile to the server 12, the server publishes the change to each of the connected clients 22 that are subscribers of the individual's information. The publisher-subscriber model enables subscribers to observe a particular individual's P&A information instantly.

Hereinafter, a user of the client terminal 22 is typically referred to as "subscriber." Unless noted otherwise, the term "subscriber" is used synonymously with the term "observer." One instance, however, in which an observer is not the same as a subscriber is if someone requests an individual's P&A information just once, without placing a subscription for it. In FIG. 1, the system 10 is illustrated as including only one server 12 and one client 22, although other embodiments of the present invention contemplate a distributed architecture including multiple management servers and multiple clients.

An individual user of the system 10 may initially configure his P&A profile settings in order to instruct the system 12 how his information is to be distributed. According to one embodiment, the individual may configure their P&A management profile set according to the following steps. First, the individual is requested to enter information regarding each of the communication devices that the individual uses and a corresponding address for each of those devices. For example, the individual may have a landline telephone with a phone number and a computer workstation with an e-mail address. Second, the individual identifies and categorizes the people to whom he wants his information published. This allows individuals to select the "more important" people and to give them easier access, whereas the "less important" people are given minimum access, and undesirable groups of people are restricted from access altogether. These different group levels may be referred to as "access levels." Third, the individual may define a series of profiles that describe a situation that the individual may be in such as, for example, "at home," "at office," or "on the road." Further, the individual may identify how he wishes to be communicated with for each profile and for each access level. In addition, where several modes of communication over one medium are possible, the individual may identify which mode is preferable.

For example, an individual may have an office profile as indicated in FIG. 2. Thus, a subscriber with an access level of "Important" would receive the items marked "Yes" in the "Important" column, with the preference indicated (where appropriate), thereby making it very easy for "important" subscribers to communicate with the individual. Persons in the "Normal" access level would receive less contact information than persons in the "Important" access level, and persons in the "Restricted" access level would receive even less contact information. Persons in the "Blocked" access level would receive no contact information at all. The individual may specify which persons belong to each access level for each profile.

Accordingly, as illustrated in FIG. 3, subscribers in various access groups would have access to different information regarding the individual. Similarly, the individual may define other profiles for different situations such as, for example, "at home," "on the road," "meeting" and "vacation." Collectively, the individual's profile for each of these situations may define a profile set.

As discussed, an individual may configure his profile such that subscribers at certain access levels have access to the individual's P&A information at certain times. For example, the individual may configure his profile such that his boss has access to the individual's P&A while the individual is at work; his wife has access all the time; and his parents have access only on weekends while not at work. Accordingly, when the P&A management server 12 detects a change in, for example, the individual's situation, the P&A management server 12 consults the individual's defined rules and preferences (which may be stored by the P&A management server 12), and transmits the appropriate information to the clients 22 for subscribers to the individual's information based on the subscriber's access groups. The presence detection engine 18 may detect a change in the individual's situation, as described further hereinafter, or the individual may communicate the change to the management server 12 directly.

Thus, with reference to the example mentioned previously, when the P&A management server 12 detects that the individual is at work, the server 12 transmits the individual's updated P&A information to the clients 22 for the individual's boss and spouse. The information that the boss and spouse receive, however, may be different based on their access levels, as discussed previously. For example, the boss may be informed of the individual's instant messaging information, but the individual's wife may not. When the individual returns home, the wife's information may be updated and the individual's parent may begin receiving information regarding the individual's P&A (although it may not be the same as the wife's information depending on their access levels). The boss, however, will no longer have access to the individual's information.

An individual may define his profile set, including his rules and preferences, via a user-interface in communication with the P&A management server 12. According to one embodiment, the user-interface may comprise a graphical user interface (GUI) application loaded on a computer device in communication with the P&A management server 12. Once defined, the P&A management server 12 may store the profiles, rules and preferences in a database (not shown). For security purposes, access to an individual's profiles etc. may be based on verification of a user PIN, password or other security mechanism. Accordingly, an individual may modify his profile settings as necessary.

In the previous example, a change in the individual's physical location triggered situation changes, and thus a change of profile. It should be noted that other factors may trigger changes in the individual's profile including, for example, time of day and the individual's mood, as explained further hereinbelow.

Figure 4:
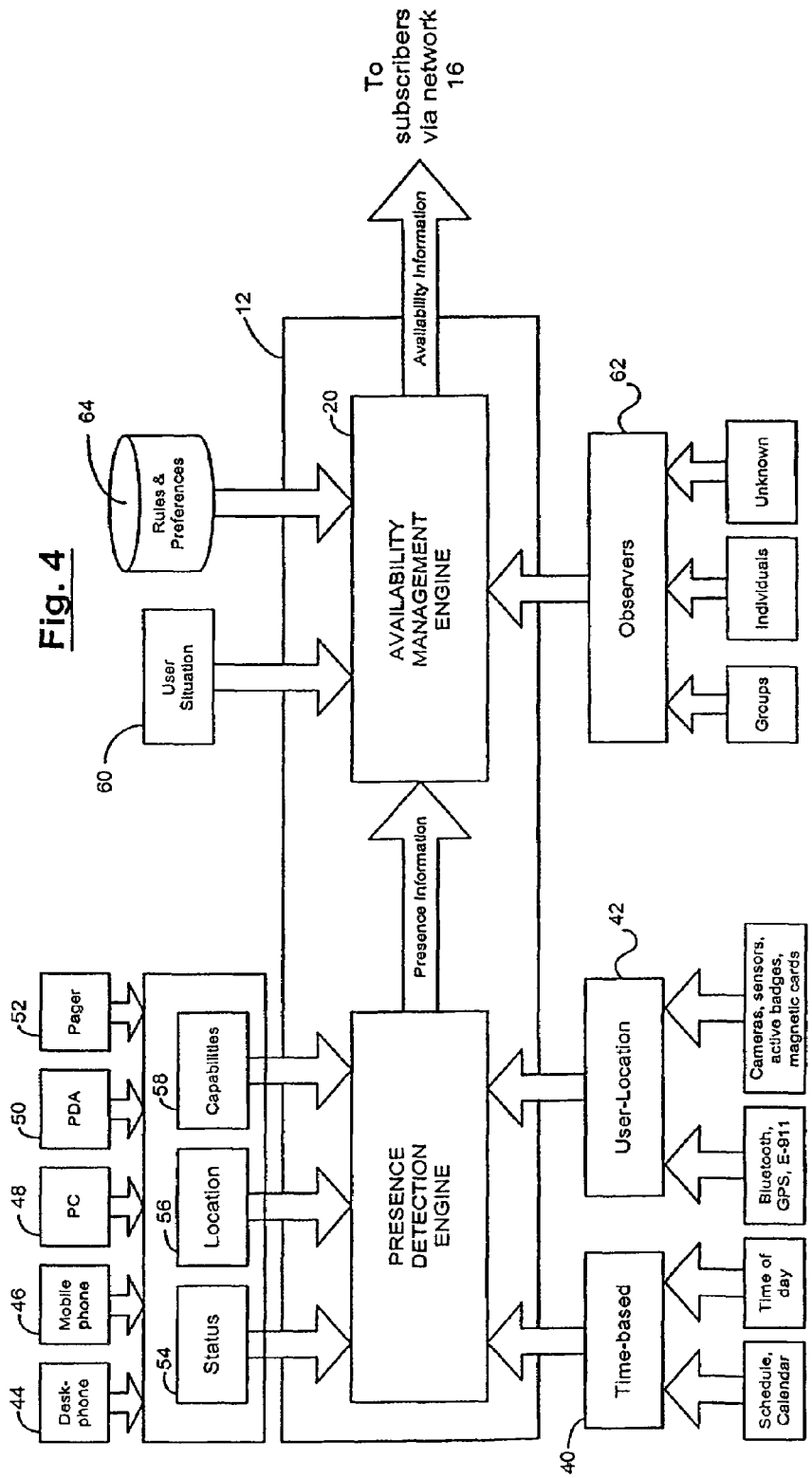
FIG. 4 is a diagram of a P&A management server according to one embodiment of the present invention.

FIG. 4 is a diagram of the P&A management server 12 according to one embodiment of the present invention. As illustrated in FIG. 4, the server 12 includes a presence detection engine 18 and an availability management engine 20. The presence detection engine 18 may determine an individual's presence upon particular networks based on various inputs, as described further hereinbelow. The presence detection engine 18 may transmit the presence information to the availability management engine 20, which in turn may determine the individual's availability based on the presence information as well as additional information, such as the individual's situation and defined rules and preferences. The determined availability information may then be transmitted to subscribers of the individual's availability information via the network 16, as described previously.

The engines 18, 20 may be implemented as software code to be executed by a processor in the server 12 using any suitable computer language such as, for example, Java, C++ or Perl using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

As illustrated in FIG. 4, the presence detection engine 18 may receive various inputs to determine, to the extent possible, the individual's presence. One type of input that the presence detection engine 18 may use to help determine the individual's presence is time-based input 40. For example, based on time of day information and known scheduling/calendar information, the presence detection engine 18 may be able to determine an individual's presence. For example, if the individual had scheduled to be in his office from 9 am to 5 pm, the presence detection engine 18 may determine that during that time period the individual is present on the networks available to him in his office, which may be, for example, telephone and instant messaging.

Another type of input that the presence detection engine 18 may use is user-location input 42. User-location information may be supplied, for example, from a number of possible networks or devices in communication with the server 12. For example, the server 12 may include a radio receiver such that the presence detection engine 18 is in communication with radio networks including, for example, a Bluetooth network, that may communicate information relating to the individual's physical locale. In addition, the server 12 may be in communication with a GPS receiver associated with the user. According to another embodiment, the presence detection engine 18 may be in communication with Enhanced 911 (E-911) networks for possible user-location information.

In addition, the presence detection engine 18 may receive input from various hardware devices that may relate information regarding user location. For example, the presence detection engine 18 may receive information from cameras, such as security cameras located at a place of employment. Thus, the camera information may relate information as to whether the individual is in the locale of his place of employment. Additionally, the presence detection engine 18 may receive input from sensors, such as pressure sensors, to help ascertain the locus of the individual. The pressure sensors may be, for example, located in the office chair or the computer keyboard of the individual, thus providing information regarding the individual's locus. Furthermore, the presence detection engine 18 may receive inputs from security equipment, such as active badge sensors, smart card sensors and/or magnetic card readers to help ascertain the location of the individual.

Additionally, the presence detection engine 18 may be in communication with other networks/device to help determine presence information. For example, the presence detection engine 18 may be in communication with a SS7 network of the public switched telephone network (PSTN) to determine if the individual is present on a landline telephone such as, for example, the landline desk phone 44 in his office. For example, the presence detection engine 18 may be in communication with a service control point (SCP) of the SS7 network. According to another embodiment, the presence detection engine 18 may receive inputs from a Home Location Register (HLR) of a wireless telephone network to determine if the individual is present on his mobile phone 46. The wireless telephone network may be, for example, an AMPS (Advanced Mobile Phone Service) network, a TACS (Total Access Communication System) network, a UMTS (Universal Mobile Telecommunications System), a GSM network, a CDMA network, a TDMA network, a GPRS (General Packet Radio Service) network or a wireless CDPD (Cellular Digital Packet Data) network. According to other embodiments, the presence detection engine 18 may also or instead of be in communication with a short messaging system center (SMS-C) of a short messaging system network or a gateway GPRS support node (GGSN). According to another embodiment, the presence detection engine 18 may be in communication with a server of a computer network.

The presence detection engine 18 may also receive inputs from computer networks such as, for example, a local Ethernet, a LAN, a wireless LAN, a MAN, a WAN, or a TCP/IP network, to determine if the individual is present on such a network, such as via his personal computer (PC) 48. Similarly, the presence detection engine 18 may be in communication with communication networks to determine whether an individual is present on other devices such as, for example, a personal digital assistant (PDA) 50 or a pager 52.

Based on the presence information on such devices 44–52, the presence detection engine 18 may determine additional information about the individual, such as the individual's status 54 on particular networks (such as on or off) or the individual's physical location 56. In addition, based on information regarding each of these devices 44–53 the presence detection engine 18 may determine the individual's current capabilities 58 such as, for example, whether he can receive voice information, data files, audio files, video files, etc.

The presence information ascertained by the presence detection engine 18 is communicated to availability management engine 20, which determines the individual's availability based thereon. To determine the individual's availability, the availability management engine 20 may receive information transmitted by the individual regarding a change in their situation 60. Such a change in user situation may be communicated to the availability management engine 20 through a communication network such as, for example, an IP network, a telephone network, or a radio network.

The availability management engine 20 may consult the individual's rules and preferences to determine the individual's availability based on, for example, the presence information from the presence detection engine 18 and the individual's situation. The individual's rules and preferences may be stored in a database 64, as illustrated in FIG. 4, or may be stored with the profile information in the database 24. Additionally, the individual may specify the observers 62 who receive the individual's contact information. The observers may be specified according to, for example, a group basis or an individual basis. The observer classification information may also be stored in a database, such as the profile database 24.

The availability information may then be published to the individual's subscribers (via the client terminals). Because the availability information is determined, in part, based on the presence information from the presence detection engine 18, the availability management engine 20 may modify the published contact information sent to subscribers based on the presence information if, for example, the individual's profile is inconsistent with the actual individual's presence. Thus, availability management engine 20 may be configured to take the presence information into account and cease from relaying the inconsistent contact information to subscribers.

Figure 5:
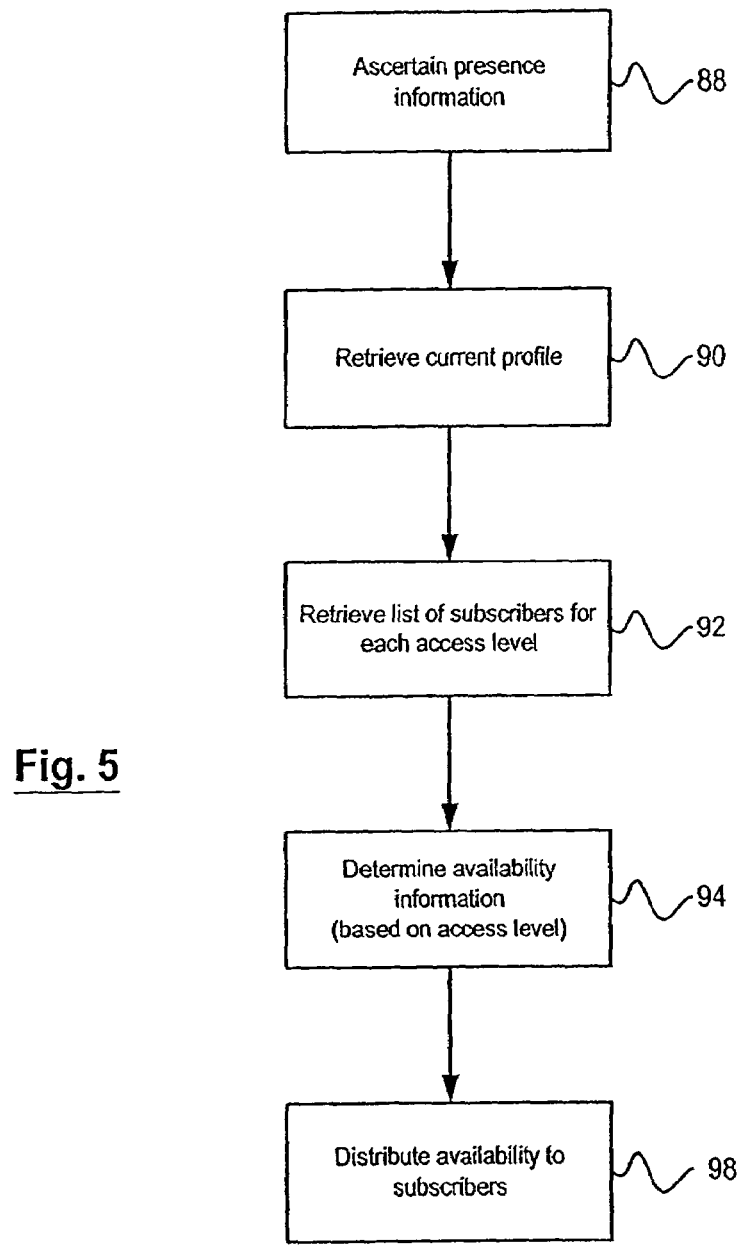
FIG. 5 is a diagram illustrating the process flow through the P&A management server of FIG. 4 according to one embodiment of the present invention.

FIG. 5 is a diagram of the process flow of the P&A management server 12 according to one embodiment of the present invention. The process initiates at block 88 where the presence detection engine 18 ascertains presence information regarding the user as described previously. At block 90, the user's current profile is retrieved from the profile database 24 based on the current user situation. At block 92, the list of observers for each access level (e.g., important, normal, restricted, work, blocked, etc.) for the current profile is retrieved.

At block 94, the availability management engine 20 may determine the user's availability for each access level based on the user's profile. At block 98 the availability information is distributed (published) to the subscribers of the information via the network 16 on a per access level basis.

Figure 6:
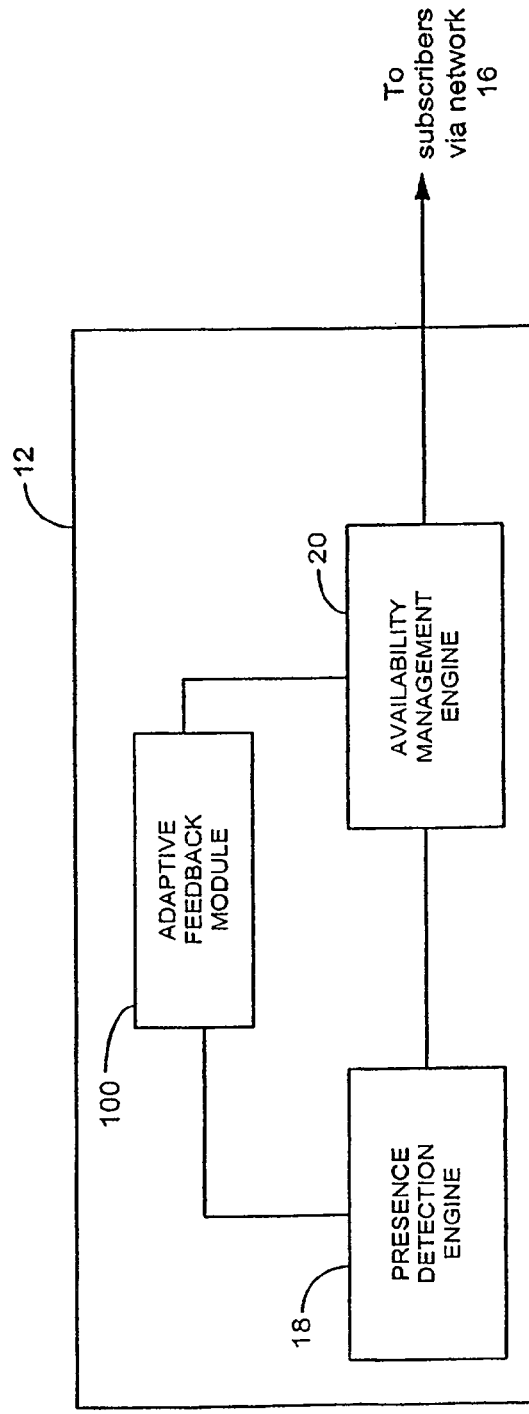
FIG. 6 is a diagram of the P&A management server according to one embodiment of the present invention.

According to another embodiment, the availability management engine 20 may first retrieve the appropriate profile based on the individual's situation. The individual's presence and availability information may then be filtered before it is published to the observers. FIG. 6 is a diagram of the P&A management server 12 according to such an embodiment. The illustrated embodiment includes an adaptive feedback module 100, which may be implemented, for example, as software code to be executed by a processor of the server 12 using any suitable computer language such as, for example, Java, C++ or Perl using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

The adaptive feedback module 100 may monitor the published availability information and, if the information is, for example, inaccurate or unusable, make adjustments to either the presence detection engine 18 or the availability management engine 20 to ensure the integrity of the published availability information. For example, if the published availability information for an individual indicates that he is available on his mobile telephone, but if the last three times someone called the individual on his mobile telephone the individual did not answer, then the adaptive feedback module 100 may instruct the presence detection engine 18 of this condition such that the published availability information for the individual will not longer indicate mobile telephone availability to the appropriate access levels until there is evidence that the individual resumes usage of his mobile telephone. The adaptive feedback module 100 may determine whether the individual's availability information is, for example, inaccurate or unusable based on information received from the appropriate communication networks with which the P&A management server 12 interfaces, as described previously.

According to one embodiment, the adaptive feedback module 100 may offer the individual a suggestion that the individual has the option of choosing to accept or reject. For example, if the adaptive feedback module 100 determines that the individual has not answered his last three telephone calls although he is present on the network, the adaptive feedback module 100 may send the individual a message asking whether he wants to discontinue publishing whether he is available on the telephone network. In this way, the individual has the ability to tune his presence and availability information.

Figure 7:
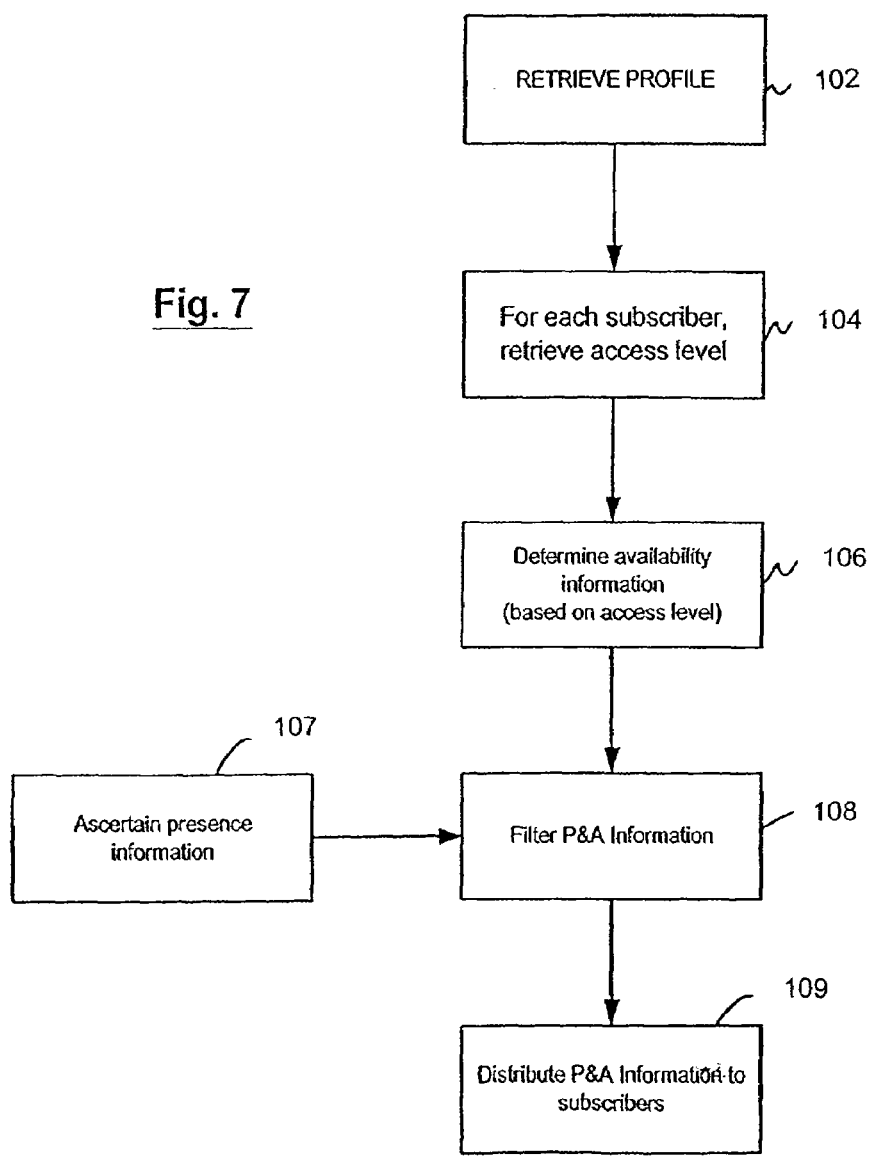
FIG. 7 is a diagram illustrating the process flow through the P&A management server of FIG. 6 according to one embodiment of the present invention.

FIG. 7 is a diagram of the process flow through the P&A management server 12 of FIG. 6 according to such an embodiment. The process initiates at block 102, where the availability management engine 20 retrieves the individual's profile based on the individual's present situation, as discussed previously. At block 104, the availability management engine 20 may retrieve the user-specified list of subscribers for each access level of the profile. Next, at block 106, based on the user's profile, the availability management engine 20 may determine the availability of the user for each access level.

At block 107, the presence detection engine 18 may ascertain the individual's presence on each of the monitored networks, as discussed previously. Based on this information, at block 108, the adaptive feedback module 100 may filter the individual's P&A information, as discussed previously. Next, at block 109, the P&A management server 12 may publish the information to each of the subscribers.

Figure 8:
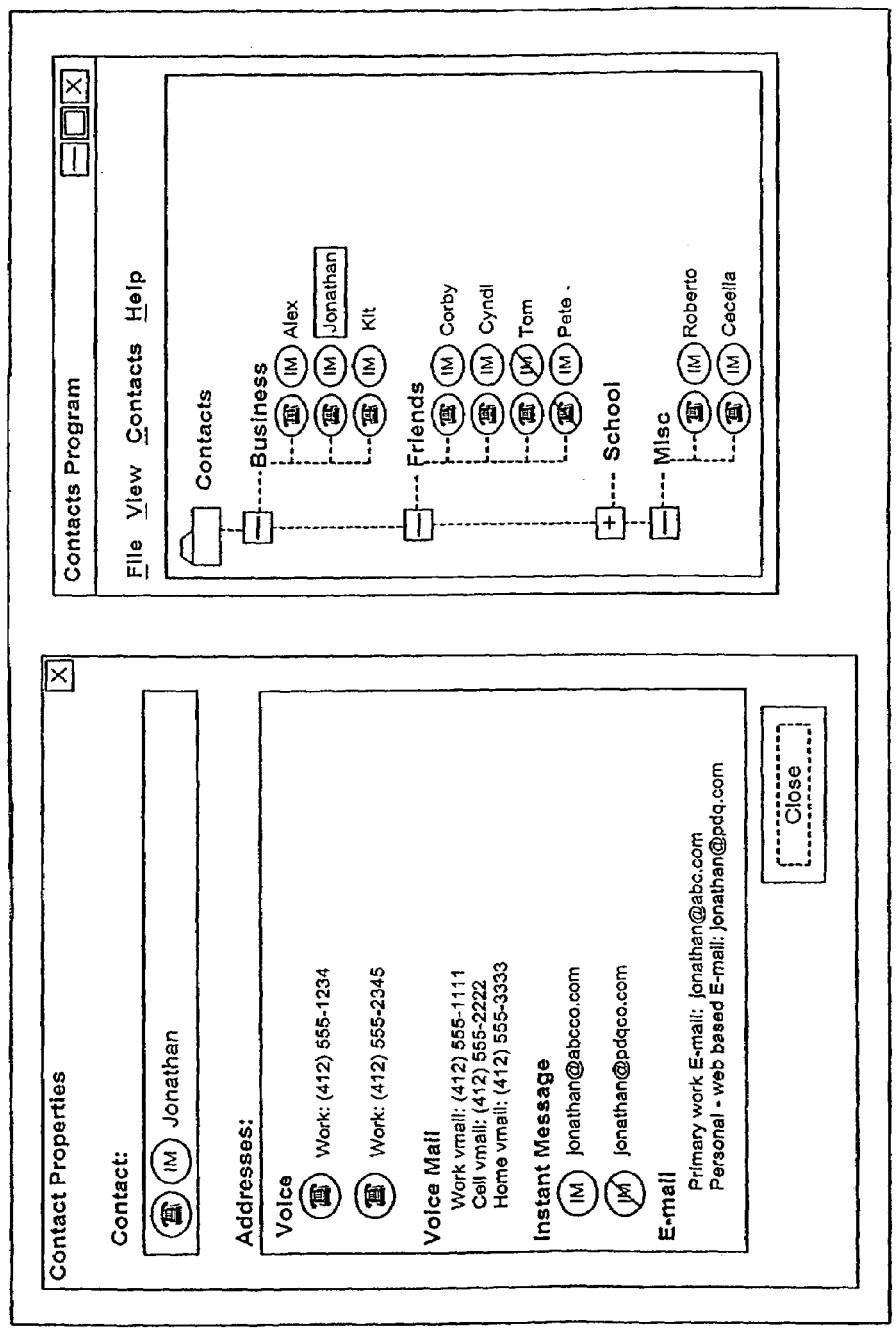
FIG. 8 is a screen shot of a subscriber according to one embodiment of the present invention.

The P&A management server 12 may transmit the availability information to the subscriber at the client terminal 22. FIG. 8 is a screen shot of the information that may be displayed to a subscriber at a client terminal 22 according to one embodiment of the present invention. As illustrated, the subscriber may navigate the list of names in the right hand window ("Contacts Program") to access the P&A information regarding the highlighted individual in the left hand window ("Contact Properties"). The indicator in the right hand window adjacent to each listed individual may identify the availability means for the particular individual. For example, in FIG. 8 Alex is available by telephone and instant messaging, but Tom is only available by telephone and Pete is only available by instant messaging. The contact information in the left hand window may be updated based on availability information transmitted from the identified individual's P&A management server 12.

As discussed previously, according to one embodiment the P&A management server 12 may store individuals' P&A information profiles in the database 24. By storing the P&A information profiles on the server 12, individuals only need to send small amounts of information to the server 12 when changing their profile. For example, when an individual using a mobile device requests a switch to, for example, an "At Home" situation, the individual only needs to send a small amount of information via the mobile device instructing the server 12 to implement the "At Home" profile rather than having to send all the P&A information associated with the "At Home" situation, which may be considerably larger. By storing the P&A information profiles on the server 12, the server 12 may have the necessary information available when individuals switch profiles. Thus, individuals only need to let the server 12 know which situation profile they prefer.

Storing the P&A information profiles on the server 12 additionally reduces the amount of resources required to invoke a profile switch operation. This may be an important feature, particularly when mobile and/or handheld devices are used. This is because conventional mobile and handheld devices, in contrast to conventional computer workstations, do not have the capability to store and process large amounts of information in relatively brief time periods. Furthermore, by reducing the amount of information transmitted, the system 10 avoids slower response times, increased latency and in general improves the user's services and experience.

In conventional P&A management systems that support heterogeneous communications networks, a given person may appear several times in the subscriber's contact list—each time corresponding to an available address. For example, each phone number and IM address of a particular individual may be listed. According to an embodiment of the present invention, as illustrated in the "Contacts Program" window of FIG. 8, the display at the client terminal 22 may relate the various entries for an individual and merge them together as one entry. For example, with reference to FIG. 8, there is one entry (indicator) for Alex, indicating that Alex is available on a telephone network and an IM network. This is indicated by the telephone icon and the IM icon next to Alex's name. Thus, the single summary indicator may be a summary of the individual's availability, with the single summary indicator containing several different icons or states that convey the availability information. According to other embodiments, the icons may indicate types of data the individual is available to receive such as, for example, text files, audio files, streaming audio files, video files, streaming video files, graphics files and streaming graphics files. According to one embodiment, the single indicator may be used to indicate the network type that the individual is available on such as, for example, IM, telephone, facsimile, etc. Other network types include a short messaging system (SMS) network, a voice over IP (VoIP) network, a paging network and a two-way paging network.

According to another embodiment, the single indicator may indicate the device type that the individual is available one, such as, for example, wireless telephone, landline telephone, personal digital assistant (PDA), computer, etc. Other device types include a SMS phone, a pager, a two-way pager, a wireless PDA, a WAP phone, and a GPRS phone.

According to another embodiment, the single indicator may be used to indicate the availability of a group of people based on whether at least one person of the group (or some other threshold number of people from the group) is available. According to such an embodiment, when at least one individual from the group is available, the single indicator may merge the availability of each individual of the group into one indicator that summarizes whether the sales staff is available. For example, the group may provide a service such as, for example, technical support, customer service, sales, etc. Thus, for example, if at least one member of the sales staff is available, the single indicator may indicate that the sales staff is available. Any type of group may be used. For example, other groups include employees of a company, employees of a given department, field sales representative, customer relationship management employees. Other groups include, for example, volunteers and members of a club or social group.

Furthermore, a large number of inputs for each of an individual's communications devices on the various networks may be processed using the presence detection engine 20 to determine the P&A status of that individual, thus allowing the results to be combined in a single availability indicator. For example, if John Doe has three telephone numbers (e.g., home, work and wireless) and is currently present and available on only one telephone network, the server 12 may notify subscribers of John Doe's information that he is present and available for telephone calls regardless of the particular telephone John Doe is currently capable of using. Accordingly, when a subscriber wishes to contact Joe Doe via instant messaging, the server 12 provides the appropriate IM address to the subscriber, taking into account John Doe's preference settings for the subscriber's access group as stored, for example, in the rules and preferences database 64. Thus, embodiments of the present invention may provide a user-friendly interface allowing subscribers to contact individuals without having to be concerned about different communication devices, their addresses and capabilities. Subscribers may instead refer to a single summary indicator and use that information to initiate point-to-point contact.

Figure 9:
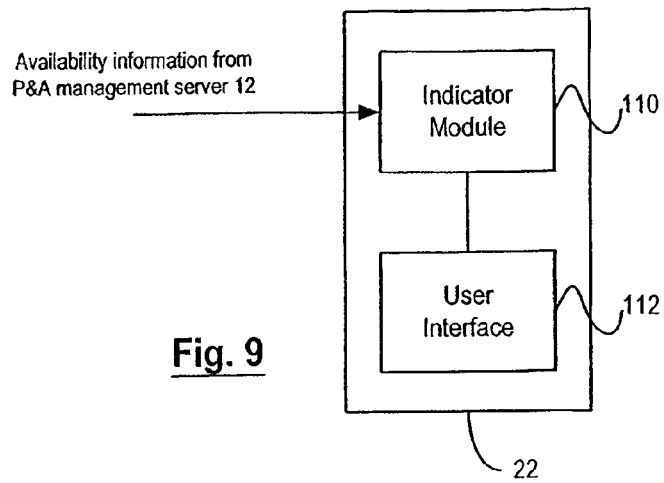
FIG. 9 is a diagram of a client terminal according to one embodiment of the present invention.

FIG. 9 is a block diagram of the client terminal 22 according to one embodiment for realizing the single summary indicator described previously. As illustrated in FIG. 9, the client terminal includes an indicator module 110 in communication with a user interface 112. The indicator module 110 may be, for example, implemented as software code to be executed by a processor of the client terminal 22 using any suitable computer language such as, for example, Java, C++ or Perl using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM. The user interface 112 may include, for example, a GUI (Graphical User Interface) or a CUI (Character-based user interface).

The indicator module 110 may receive availability information from one or more P&A management servers 12 and merge the contact information for each individual into a single summary indicator, as described previously in connection with FIG. 8, for display by the user interface 112. The indicator may identify the individual, such as by name, as illustrated in FIG. 8. In addition, as illustrated in FIG. 8, the indicator generated by the indicator module 110 may indicate whether the individual is available to receive, for example, certain data content types. For example, with reference to FIG. 8, the indicator for Jonathan identifies Jonathan by name and indicates that Jonathan is available to the subscriber to receive data content by telephone and instant messaging.

Figure 10:
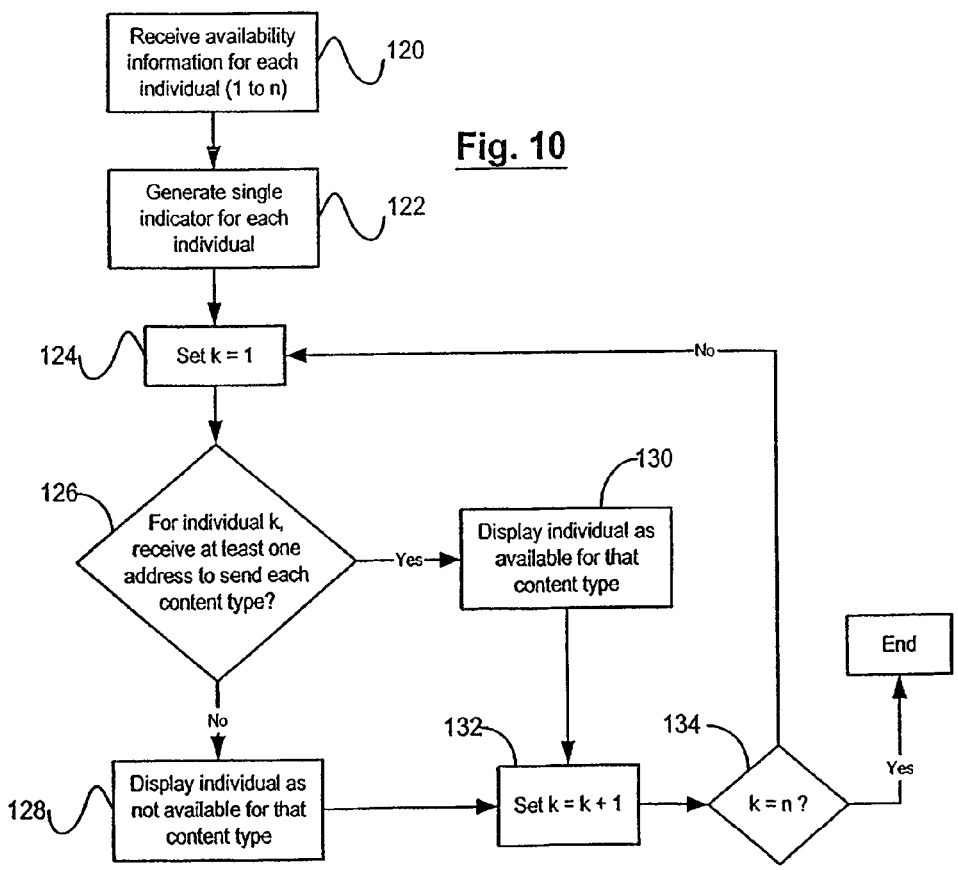
FIG. 10 is a diagram of the process flow through the client terminal of FIG. 9 according to one embodiment of the present invention.

FIG. 10 is a diagram of the process flow through the indicator module 110 according to one embodiment. The process initiates at block 120, where the indicator module 110 receives the availability information of each individual to which the client is a subscriber (n individuals). For example, with reference to FIG. 8, the client terminal receives the availability information for Alex, Jonathan, Kit, Corby, Cyndi, Tom, Pete, Roberto, Cecelia, as well as the individuals in the "Mint" folder. At block 122, the indicator module 110 may generate a single summary indicator for each of the n individuals. For example, the indicator module 110 may relate the various addresses for a given individual and merge them into a single summary indicator for each of the individuals, as illustrated in FIG. 8.

At block 124, a counter, k, is set to equal 1. At block 126, for individual k for which the client subscribes to contact information, the indicator module 110 may determine whether an address for each data content type (e.g., telephone, text (IM), video, graphic, audio, etc.) has been transmitted from the P&A management server 12. For a particular content type, if no address has been received, the process advances to block 128 where the indicator module 110 displays that individual k is not available for the particular content type. For example, with reference to FIG. 8, the indicator for Tom indicates that Tom is not available to receive IM (text) data. Conversely, if at block 126 it is determined that an address has been received for the particular content type, the process advances to block 130 where the indicator module 110 may display that the individual is available to receive the particular data content type. This process may be repeated for each data content type.

Once the availability of individual k has been determined for each data content type, the process advances to block 132, where k is set to equal k+1. From block 132 the process advances to block 134 where it is determined whether k equals n. If so, the process is completed at block 136. If not, the process returns to block 124 where the process may be repeated for the next individual.

In FIG. 9, the indicator module 110 is illustrated as residing on the client terminal 22. According to other embodiments, the indicator module 110 may reside, for example, on the P&A management server 12. According to such an embodiment, the P&A management server 12 may forward the indicator information via the network 16 to the client terminal 22 for display thereby. Such an embodiment may be advantageous where, for example, the client 22 is a device of limited processing capability such as, for example, a WAP-enabled telephone.

In contrast to some prior P&A management systems, embodiments of the present invention utilize a publisher-subscriber model. That is, the individual's availability information is published on an event-triggered basis to subscribers of the individual's availability information, rather than transmitted only when requested by the subscriber. Accordingly, changes in an individual's availability are broadcast instantly to subscribers of the individual's P&A information, assuming those subscribers satisfy the individual's rules and preferences regarding dissemination of his P&A information. The P&A management server 12, as described previously, may maintain the individual's profile settings. In addition, the subscribers may be equipped with client software that allows the P&A information of various individuals to be displayed for the subscriber, such as illustrated in conjunction with FIG. 8.

Additionally, according to one embodiment, users of the P&A management system 10 may configure their P&A profiles to specify how their availability information is distributed. Individuals may accomplish this task by specifying a number of different access levels and situations. Subscribers of the individual's information are only provided with certain availability information depending on their access level and the situation. In addition, the P&A profiles may be stored on the P&A management server 12 (such as in database 24). This obviates the need for individuals to re-transmit all their contact information each time their availability changes. Rather, the P&A management server 12 may determine the individual's availability based merely on the individual's profile and information regarding the individual's situation.

For individuals that have a presence and availability on the Internet or other types of IP networks, their domain name address is often an extension of a domain name server for an organization (e.g., an employer's corporate intranet). Consequently, communications with the individual may typically be established by resolving the domain name server for the organization. However, for certain services, individuals with addresses at those domain name servers are at the mercy of the system administrator to modify their address entries in order to use the new services. For example, an individual desiring to use a new instant messaging service through a corporate intranet would require the system administrator to add the appropriate address entry to the corporate intranet. Often system administrators are not inclined to do this.

According to an embodiment of the present invention, illustrated in FIG. 11, this potential dilemma is addressed by providing a fallback resolution mechanism. For example, a subscriber at client terminal 22 may first attempt to communicate with an individual at client terminal 140 via one or more intermediate relay hosts 142. One of the hosts 142 may be, for example, an instant messaging host or a presence and availability host.

If one relay host 142a does not know the address for the next intermediate relay host 142b, the first relay host 142a may attempt to communicate with the second relay host 142b by, for example, resolving a record (such as an MX record for e-mail) for the second relay host 142b at a primary domain name server 144. If that fails, the first relay host 142a could attempt to resolve the record at a secondary domain name server 146. The address for the record at the primary domain name server 144 may be a hierarchical extension of the address of the secondary domain name server 146, as described further herein. As used herein, the term "domain name server" includes both domain name servers for UNIX networks as well as Windows networks, commonly referred to as "WINS" (Windows Internet Naming Service).

The secondary domain name server 146 may include a resolver 148 and an IP address database 150. The IP address database may include the IP address for the intermediate relay host 142b that the primary domain server 144 did not include. When directed to the secondary domain name server 146 by the primary domain name server 144, the resolver 148 may respond with the address of the second intermediate relay host after interrogating the database 150. The secondary domain name server 146 may supply the address directly to the first relay host 142a or, according to another embodiment, may supply it to the primary domain name server 144, which in turn may supply the address to the relay host 142a.

For example, if the hostname of the client terminal 140 is joe@abcd.com, and Joe wanted to use a new instant messaging service that required the system administrator for the abcd.com domain name server 144 to add a DNS entry of im.abcd.com to point to the appropriate host 142b, but the system administrator refused to so modify the domain name server 144, the first domain name server could direct the relay host 142a to the secondary domain name server 146, efg.com, to resolve im.abcd.com.resolver.efg.com. The secondary domain name server 146 may be configured appropriately through a web-based interface and, when queried, would direct the relay host 142a to the appropriate server (to im.abcd.com in this example). According to one embodiment, a query, by email for example, may be sent to joe@abcd.com to determine whether the entry may be legitimately made.

The process just described is not limited to situations where a host does not know the address of another host. The process may also be utilized to allow a client terminal (such as terminals 22 or 140) resolve the address of a host 142 and vice versa. The primary domain name server 144 may be programmed to supply the address for the secondary domain name server 146 to the intermediate host 142 or client terminal. According to other embodiment, the client terminal or intermediate host may be programmed with the address of the secondary domain name server 146 for when the primary domain name server 144 is not capable of resolving the request.

Although the present invention has been described herein with respect to certain embodiments, those of ordinary skill in the art will recognize that many modifications and variations of the present invention may be implemented. For example, with respect to FIG. 12, additional hierarchical domain name servers may be utilized. The foregoing description and the following claims are intended to cover all such modifications and variations.

What is claimed is:

1. A method for communicating communication network availability information regarding an individual to at least a first person and a second person, the method, comprising:

detecting whether the individual is present on at least one communication network;

determining availability of the individual;

publishing via a network a first availability profile for the individual associated with a first access level of the individual to the first person;

publishing via the network a second availability profile associated with a second access level of the individual to the second person, wherein the first and second availability profiles respectively indicate different ways in which the first person and the second person may access the individual, and wherein the first person views the first availability profile before contacting the individual and wherein the second person views the second availability profile before contacting the individual; and filtering for the availability of the individual when it is detected that the individual is no longer present on the communication network, wherein the first profile indicates that the individual can be contacted by instant messaging and by telephone and wherein the second profile indicates that the individual cannot be contacted by phone but can be contacted by instant messaging.

2. The method of claim 1 wherein the first profile is viewed by the first person in the first person's contact list and the second profile is viewed in the second person's contact list.

3. The method of claim 1 wherein the first and second profiles are viewed in the individual's contact list.

* * * * *